United States Patent Office 3,131,116
Patented Apr. 28, 1964

3,131,116
POST FORMING OF DECORATIVE LAMINATES
Lewis Charles Pounds, Riverside, Conn., assignor to American Cyanamid Company, Stamford, Conn., a corporation of Maine
No Drawing. Filed June 10, 1959, Ser. No. 819,230
6 Claims. (Cl. 161—258)

This invention relates to a novel process for the manufacture of decorative laminates. This invention further relates to a process for the preparation of high-pressure, heat-resistant decorative melamine resin bonded laminated structures and to the products derived therefrom which exhibit improved post-formability properties. This invention more specifically concerns a novel process for curing under heat and pressure a melamine decorative laminate assembly whereby the overlay member or surface portion is cured to a degree necessary to render same heat-resistant and the cure of the remainder of the laminate assembly is advantageously moderated so that the total assembly is capable of being readily post-formed without the occurrence of deleterious cracking or crazing.

It is an object of this invention to provide a process for preparing decorative heat-resistant laminates derived from melamine-formaldehyde condensates exhibiting improved properties particularly that of being amenable to post-forming, hot-punching and analogous techniques.

Another object of this invention is to provide a process for curing of decorative, melamine resin laminates wherein the curing of the individual members composing the assembly is selectively controlled so as to result in final products having improved post-formability properties together with surface areas exhibiting a high degree of heat and chemical resistance.

The detailed discussion and examples presented hereinbelow will serve to illustrate more completely these and other objects of this invention.

The molding application to which this invention is directed involves the preparation of decorative, resin-bonded multilayer structures commonly referred to as laminates, and more specifically high pressure melamine laminates wherein a thermosetting amino formaldehyde condensate is employed to impregnate the decorative portions thereof. Such structures are exemplified by those laminated articles intended to be used as horizontal or working surfaces, e.g., table, counter and bar tops. Additionally, such structures are oftentimes employed as wall coverings, facings for kitchen cabinet assemblies and the like applications. This invention is more specifically directed to the preparation of said decorative, resin-bonded laminated structures where it is contemplated that the consolidated sheet-like laminate will be bent or otherwise shaped for functional or decorative purposes. Examples of instances where it may be desirable to post-alter the shape of the decorative laminate as received from the fabricator thereof is in the manufacture of table tops having contoured edges or in the preparation of sink working areas where the splash appendage is desirably an unbroken continuation of the horizontal surface. The conventional high pressure laminate is a highly refractory material and does not lend itself to any amount of extensive shaping. While it is possible for the laminator to achieve any shape desired during the manufacture of the laminate, it is a virtual impossibility to accommodate the legion of particular custom designs that may be required by the consumer. Thus there is an important need for high-pressure laminates which may be shaped "on the job" and in turn conform to the high standard of physical properties ordinarily associated with such articles.

In laminated articles of the type herein concerned, the core is conventionally composed of a plurality of kraft paper plies, which have been impregnated with a phenolic resin and which resin exists infused throughout the individual plies in an uncured state. The function of the core is to impart rigidity to the laminated structure. Insofar as this part of the laminate cannot be seen and additionally since this part is not subjected to abrasive conditions, the core is customarily fabricated from relatively inexpensive materials. Suitable core stock members are prepared using a low-cost kraft paper and the least amount of a low-cost phenolic resin capable of providing a good bond for the core assembly. Generally, when it is intended to prepare a post-formable laminate the use of kraft paper plies in crepe form is utilized. Creped kraft paper may constitute all of the plies of the core member or may constitute only a portion thereof. In the preparation of the post-formable laminates in accordance with this invention, the use of the relatively more expensive crepe kraft paper plies for the core member may be observed in accordance with prior art practices although this is not essentially required in order to achieve the results of my invention.

A so-called print sheet supplies the decorative effect associated with the laminate, and in preparing the assembly for lamination, it is placed on top of the sheets constituting the core member. The print sheet generally consists of a pure grade of an absorbent alpha cellulose or regenerated cellulose paper which has been printed with a design or dyed or pigmented to impart a solid color thereto. Printed designs may be employed having an unlimited range or form of artistic effects so long as the inks of the coloring matter contained therein are non-bleeding in the resin comprising the infused resin component of the print sheet or that of the subsequently applied overlay sheet. The print sheet also serves as a barrier sheet for the core stock member, thus masking the unattractive appearance of the core stock and additionally barring any extensive bleeding or migration of the phenolic resinous material contained thereby that otherwise might be apparent on the decorative surface of the laminate. The print sheet is required to have good appearance and durability. These properties are conventionally achieved by impregnating the print sheet with a melamine-formaldehyde resin, although formaldehyde condensates of other amino triazine compounds, particularly if employed in combination with a major amount of melamine, may be used. Sometimes it is desirable to modify the melamine-formaldehyde condensate with a material such as for instance alpha-methyl d-glucoside, mixtures of o- and p-toluene sulfonamides, and the like, in order to beneficially plasticize the resinous composition. The melamine resins, whether they comprise an unmodified condensate or a modified condensate as indicated, are constituted to impart hardness, abrasion resistance, solvent resistance and color stability to the print sheet.

Because of the excessive wear to which decorative laminate surfaces, especially the horizontal working surfaces such as table tops, are generally subjected, it is conventional practice in this art to lend greater durability to the laminate structure by applying a overlay sheet over the print sheet. The overlay sheet, oftentimes called the decorative overlay, usually consists of a single sheet of paper, generally a very high grade of alpha cellulose paper, treated with a melamine-formaldehyde resin more often than not corresponding to that used to impregnate the print sheet member of the assembly. The primary objective in the use of the overlay sheet is to impart durability to the print sheet without detracting from its appearance. As mentioned, the melamine resins are favored for impregnating the overlay sheet because of their aforementioned desirable properties, and when thus employed are present therein in a very substantial amount. The resin content of the overlay sheet is customarily between about 60 and 70% of the weight of the treated sheet. In comparison, the conventional resin content of the print sheet is in the order of about 50% of the treated sheet and the resin content of the core sheets ranges from about 25 to 35% of said treated sheets. The conventional decorative laminates are usually from about 50 to 60 mils thick. Of this thickness the overlay sheet represents about 2 to 4 mils, the print sheet is conventionally in the order of about 5 to 9 mils and the core member constitutes the rest of this assembly.

When a conventional decorative laminate assembly is cured under the usual applicable pressures, that is, from about 800 to 1500 p.s.i., the curing is effected in a temperature range wherein the melamine resin as well as the phenolic resin present is regarded as being completely cured. The usual temperature range employed to effect complete curing is from about 140 to 145° C. The time required at a temperature within this range is in the order approximately 15 minutes although for all conventional unmodified melamine resins, a period anywhere from about 5 minutes shorter or longer can be tolerated. When cured under the stated conditions the laminate, particularly the surface area thereof, will be rendered highly resistant to heat, that is, hot objects may be placed on the surface of the laminate ranging in temperature as high as about 180° C. for as long as 20 minutes without any noticeably visible effect upon the plastic. Also such a composite cured to a point where it exhibits adequate heat-resistance in the nature described will also manifest excellent chemical resistance.

In connection with this discussion of what constitutes substantially complete cure as understood in the art relating to the manufacture of decorative melamine laminates, it must be appreciated that the concept of cure alone as generally applicable to these resins is a relative term. Thus cure of these resins is realized, and so ordinarily understood, when the resinous condensate is converted to a substantially insoluble and infusible state. However, the variable degree of cure represented by such a characterization may or may not approach the concept of substantially complete cure as thought of in the melamine laminating art. Unfortunately, the meaning of complete cure in this art can be only qualitatively denominated and accordingly is expressed as the laminate's ability to pass certain prescribed tests. The principal one of these tests is in the nature of determining the plastic resistance to heat as described above. Identification of this test and details with regard thereto will be given hereinbelow.

It is not possible to post-form the laminates cured in the manner as aforesaid. When post-forming is attempted, the laminate will readily crack. In the prior art there are several methods practiced for obtaining post-formable decorative melamine laminates. One of these methods consists of somewhat under-curing the laminate assembly during the consolidation process. While this method permits the assembly to be post-formed, untoward deficiencies in the nature of subnormal heat and chemical resistance properties of the laminate are noted. Additionally, such assemblies develop a dull surface appearance in the proximate area of where the shaping or bending force is applied.

Another method practiced by the prior art in preparing post-formable laminates consists of more or less extensively modifying the formaldehyde condensates of melamine used to impregnate the print and overlay members of the assembly. The disadvantage residing in this method is that when an effective amount of the modifier or plasticizer is used in conjunction with the melamine resin, whether the plasticizing is internal or otherwise, there results an inferior degree of heat and chemical resistance associated with the cured products derived from such compositions. As mentioned hereinbefore the use of a limited amount of plasticizer or modification of the melamine condensate may be advantageously observed but the extent of said modification or plasticizing should not seriously detract from the heat and chemical resistance ordinarily associated with the unmodified condensates.

In accordance with this invention, post-formable decorative laminates of the type herein concerned can be prepared by effecting the complete cure of the resinous content associated with the overlay while at the same time slightly undercuring the resinous materials associated with the core and barrier members. This particular condition cannot be effected by use of any particular temperature range alone because the melamine condensates cure in about the same rate as the phenolic resin at any given curing temperature. I have found that if the infused resinous component of the overlay sheet is properly catalyzed, then the total assembly can be cured at lower temperature than ordinarily used and still effect complete cure of the overlay member. At the same time there is obtained somewhat less than complete cure in the base and barrier members. Accordingly, my process comprises the use of a curing accelerator in the overlay member and consolidating the various components at a temperature less than about 140° C. In order to achieve reasonable and practical cure rates for the overlay member it is desirable to maintain the effective curing temperature within the range of from about 130 to 140° C. It is further preferred that the complete curing of the overlay member be accomplished in a period of heating ranging from about 10 to 20 minutes at the cure temperature indicated.

The precise type of catalyst which may be used in the overlay member does not go to the essence of the instant invention. Thus, a variety of well-known acid condensation catalysts useful for curing melamine-condensates may be employed. They include inorganic acids, e.g., sulfuric, hydrochloric, phosphoric, boric and the like; organic acids and anhydrides, e.g., acetic, tartaric, benzoic, propionic, adipic, oxalic, fumaric acids, hexachlorophthalic anhydride, maleic anhydride, etc.; acid salts, e.g., ammonium chloride or sulphate, mono sodium phosphate and the like. The amount of acid catalyst conventionally employed ranges from about 0.02% to about 5% by weight of the composition and usually about .5 to 5% is the preferred range for the more suitable catalysts. However, in the preparation of decorative laminates derived from melamine resins there are a number of practical considerations involved in the preparation of the laminate which render it desirable to employ particular types of condensation catalysts or catalyst systems in the practice of my invention. Generally a fabricator will receive the melamine resin in a solid anhydrous form and prefers to make his own impregnation syrups therefrom. Therefore, it is usually desirable that the resin sold to the fabricator contain the catalyst in order to simplify the laminator's use of the resin. Consequently, if the catalyst is to be supplied in admixture with the resin it is necessary that it be of a special nature so that it will not volatilize or cause premature gelation of the condensate when subjected to dehydration procedures such as vacuum concentration, spray drying and the like. For effective catalysis, the catalyst should not only be compatible in amounts used with the melamine resin but should also be homogeneously dispersed therein. Homogeneous dispersion can be best accomplished by mixing the catalysts with the completed reaction product when it is in an aqueous syrup state following the completion of the condensation process. Further, in the preparation of decorative laminates, the impregnation of the barrier or print sheet and the decorative overlay is ordinarily accomplished by the fabricator of the laminated article. For instance the impregnation of the overlay is conventionally observed by passing the overlay paper through a bath of the aqueous melamine resin solution and then subsequently drying said overlay. This obviously necessitates the use of elevated temperatures and accordingly a suitable catalyst for the preparation of the laminates according to this invention should not effect substantial advancement of the impregnated member before it is consolidated to prepare the laminate such as in a drying operation of the type mentioned.

Particularly efficacious, and accordingly the preferred catalyst systems for the melamine formaldehyde resins used to impregnate the overlay sheet, comprise a mixture of a volatile alkyl alkylol tertiary amine and an acid having a dissociation constant greater than $1.0 \times 10^{-5}$. This type of system represents a buffered catalyst which exhibits latent characteristics, that is, it will not in short periods of time substantially advance the polymerization of the melamine condensate at temperatures less than approximately 120° C. but once a temperature in the range of about 130 to 140° C. is obtained complete cure of the condensate is rapidly effected. In catalyst systems of this preferred type it is desirable to use an alkyl alkylol tertiary amine having a molecular weight less than 140. Among those tertiary amines which may be used are dimethyl methanol amine, dimethyl ethanol amine, dimethyl propanol amine, dimethyl butanol amine, dimethyl pentanol amine, diethyl methanol amine, diethyl ethanol amine, diethyl propanol amine, dipropyl methanol amine, methyl dimethanol amine, methyl diethanol amine, ethyl dimethanol amine, ethyldiethanol amine, propyldiethanol amine, butyl dimethanol amine and the like. These particular amines are preferred because relatively small amounts will effectively buffer the acid catalyst to be employed thereby obviating the use of large amounts of the less effective amines which may tend to undesirably modify the melamine-formaldehyde composition.

Any acid having a dissociation constant greater than $1.0 \times 10^{-5}$ may be used in combination with the alkyl alkylol tertiary amine provided that it is compatible with said amine and with the melamine resin. Among those acids which have been found to be suitable are acetic acid, hydrochloric acid, sulfuric acid, phosphoric acid, benzoic acid, tartaric acid, lactic acid, propionic acid and the like. Additionally it is possible to use many other acids of the type described provided they have a dissociation constant greater than that specified such as halo substituted acids, for example, chloro acetic acid and the like. However, if color of the laminate is of prime importance, and generally such is the case, it is desirable to avoid the use of these halo substituted acids.

In the preparation of latent catalyst systems as aforesaid the ratio of the acid to tertiary amine may be varied over a very substantial range such as 1:0.5 to 1:10 parts by weight of said acid to amine, respectively, and preferably the weight ratios are from about 1:2 to 1:5 acid to amine, respectively. The weight ratio of the resin to the acid-amine mixture may be between 1:0.001, respectively, and preferably between 1:0.005 and 1:0.02, respectively. It will be obvious to anyone skilled in the art in the selection of a particular amine to be used in combination with a particular acid, one should take into consideration the alkaline or buffering effect of the amine and the strength of the acid. In general the pH of an aqueous solution of the resin and the acid-amine mixture should be at least 7 and preferably in the range between about 7.5 and 10. The choice of any given pH as will be apparent to one skilled in the art, is not completely arbitrary. It is generally desirable to operate at a pH which for the given acid-amine mixture will substantially completely cure or set the melamine-formaldehyde condensate in about 2 minutes at 150° C. It has been observed that when the catalyzed melamine resin exhibits a cure rate characterstic of this nature, it will cure properly within the contemplation of this invention when subjected to curing conditions specified herein, that is, in the order of 15 minutes at a temperature from about 130 to 140° C. As mentioned previously, the use of the amine-acid mixtures as curing accelerators is particularly preferred for practical considerations and it is to be understood that the concept of my invention is not limited to the use of these latent catalyst systems. As a matter of fact, my process can be suitably practiced if conventional condensation catalysts such as phthalic anhydride is employed with the resin used to impregnate the overlay. However, as mentioned, the use of catalysts of this type poses certain but not unsurmountable problems with regard to the preparation of the laminate.

The thermosetting resins contemplated for use in impregnating the overlay and print sheets constitute the condensation products of formaldehyde and melamine, which products are carried to an intermediate point of condensation whereby the condensate is water soluble but nevertheless will completely cure on the application of heat.

The ratio of melamine to formaldehyde employed in the preparation of the condensates useful herein ranges from about 1:1 to 1:6, respectively. The preferred range of melamine to formaldehyde in preparing laminating resins is from about 1:1 to 1:3. The condensation reaction between the formaldehyde and melamine may be carried out at normal or elevated temperatures, at atmospheric, sub-atmospheric or super-atmospheric pressures, and under neutral, or alkaline conditions. However, it is preferred that the condenstion be effected under pH conditions in the range of from about 7.0–11.0 and preferably in the range of pH 9.0–10.0 at a temperature from about 25° to 105° C. Suitable alkaline condensation catalysts which type is preferred in conducting the condensation reaction includes substances yielding an alkaline aqueous solution, for example, alkaline metals and oxides, alkali metal hydroxides or salts thereof with weak acids. Additionally, amines may be used. Specific examples include such as sodium hydroxide, sodium carbonate, triethyl amine and the like.

It is preferred to conduct the condensation reaction between the melamine and formaldehyde in an aqueous medium. However, the use of non-aqueous mediums such as water-soluble alcohol ketones and the like may be used. Formaldehyde constitutes the preferred form of this aldehydic component, however, compounds engendering formaldehyde such as paraformaldehyde, hexamethylenetetraamine and the like may be used.

As indicated hereinabove the condensation is carried to an intermediate point whereby the condensate remains essentially water soluble. A convenient test for determining the maximum and optimum extent of the condensation reaction consists of determining the reaction mixture's tolerance for water by the conventional hydrophobicity test. This test consists of adding four drops of the reaction medium to 25 ml. of water at 0–3° C. and noting when such a solution develops as blue haze.

The methods of fabricating the decorative laminates of this invention are well known in the art and need not be detailed here, particularly insofar as such coventional practices can be noted from the specific embodiments given hereinbelow.

In order that this present invention may be more completely understood, the following examples are set forth in which all parts are parts by weight unless otherwise indicated. These examples are set forth primarily for the purpose of illustration and any specific enumeration of detail therein should not be interpreted as a limitation on the case except where indicated in the appended claims.

EXAMPLE I

A resin constituting the condensation product of formaldehyde with melamine wherein the mol ratio of formaldehyde to melamine is 2.0 is prepared as follows. Into a suitable reaction vessel equipped with a stirrer, thermometer and reflux condenser were charged 1743 parts of 37% aqueous formaldehyde (Formalin) and 100 parts of demineralized water. The system was adjusted to a pH of 8.5 with triethylamine. Thereupon 1355 parts of melamine were added and heat applied to the reaction medium. The temperature was raised to the reflux point (98°–102° C.) and held at this temperature until a standard condition of hydrophobicity is obtained which is indicated with 4 drops of the reaction medium, when added to 25 ml. of water at 0–3° C. results in solution having a blue haze.

At this point approximately one-half of the reaction syrup was discharged from the reaction vessel. To this portion was added 1% by weight, based on the solid resin content thereof, of a homogenous mixture consisting of 1 part glacial acetic acid, 2 parts diethylethanol amine and 3 parts water. The catalyst system was homogenously dispersed throughout the resinous syrup by stirring. The addition of the catalyst in the amount stated resulted in a pH of 8.7. The resinous syrup was then spray dried by conventional means.

The condensate remaining in the reaction vessel was cooled to approximately 65° C. and vacuum concentrated at 23″ vacuum (approximately 7″ Hg) until a resinous syrup having 51.3% resin solids was obtained. To this aqueous syrup was added a sufficient amount of isopropanol in order to reduce the resin solids content to 50%.

A sheet of white paper (H–499 Hurlbut Paper Company) was impregnated with the melamine-formaldehyde aqueous syrup as described hereinabove. The resin impregnated paper was then dried under a battery of heat lamps. Drying conditions were so chosen so as to give a dry impregnated sheet containing about 4.0% volatile content. Resin pick up was determined to be about 45% of the treated sheet.

The spray dried resin described above was dissolved at a solids content of 50% in a solvent system consisting of 95–5, water to isopropanol, respectively. A substantially pure grade of alpha cellulose paper (H–812 overlay, Hurlbut Paper Company) was impregnated with the catalyzed melamine resin syrup. The resin impregnated paper was then dried under a battery of heat lamps. Solid resin pick up was in the order of 66%. The volatile content of the impregnated overlay was about 5.0%.

A laminate assembly was made from 6 sheets of standard core stock (phenolic resin impregnated kraft paper), the impregnated print sheet (H–499) and the sheet of impregnated overlay. The assembly of the various sheets was in the order mentioned. The plies were consolidated by heating for 15 minutes at 135° C. taking about 7 minutes time to gradually achieve this temperature and utilizing a similar period for cooling the consolidated assembly to room temperature. The pressure employed during the actual curing temperature of 15 minutes was 1100 p.s.i. The assembly was identified as Specimen A. Another assembly, Specimen B, wherein the core member consisted of 3 sheets of kraft and 2 sheets of creped kraft was prepared in the identical manner as above.

The testing of the individual laminate's resistance to high temperature was done in accordance with the method LP2–2.03 contained in the National Electrical Manufacturers Association (NEMA) Standards Publication for laminated thermosetting decorative sheets. This test is commonly referred to in the trade as a "hot casserole" test and essentially consists of placing a flat bottom aluminum vessel containing hot wax at 180° C. upon the surface of the laminate. The vessel is allowed to stand for 20 minutes and then removed.

Specimens A and B tested in the manner indicated revealed no surface injury as determined by the method suggested in said section, namely visually examining the test specimen at a high incidence light reflection angle.

In testing the post-formability characteristics of decorative laminates the procedure prescribed in the aforesaid NEMA Standards was employed. More specifically this method is described in detail in Section LP2–2.11 of said publication. The method consists of employing laminate specimens of size 2″ x 8″. A standard heater is utilized whereon the test specimen is placed 3 inches above the heating elements. A potential across the standard heater is maintained at 120 volts. When the specimen has reached constant temperature, it is placed in a bending jig with the decorative face down, and formed therein. The closing time specified after initial contact of the force with the specimen is not to exceed 1 second. The specimen with the pressure exerted thereon is allowed to form while cooling in the jig for 1 minute. The forming or shaping portion of the jig consists of two engageable blocks, the lower member of which, and upon which the specimen face is placed, consists of a stationary and fixed block of prescribed dimensions having a cavity in the shape of a 90° notch. The top forming block or force is of a male design capable of engaging the notch of the bottom block. The bottom extremity of the force consists of a longitudinal edge, the cross-sectional area of which corresponds to an arc of a circle. The radius of the circle determines the extent to which the specimen is to be shaped. The standard arc prescribed in testing post-forming characteristics of decorative laminates is that of a circle having a radius of ¾ inch. However, the laminates prepared in accordance with this invention can be successfully post-formed using arcs of circles considerably less in diameter than the standard prescribed, as will be shown hereinbelow.

Laminate Specimens C and D were prepared in the identical manner as described hereinabove except that in each the overlay member constituted a sheet of the standard H–900 overlay paper impregnated with the aforedescribed uncatalyzed melamine syrup. In each instance the dried impregnated overlay was assembled with an impregnated print sheet and 5 sheets of phenolic resin impregnated kraft paper, 2 of which were of the creped type. These assemblies were cured using two different types of curing conditions. In curing Specimen C, said curing conditions consisted of consolidating the assembly under a pressure of 1100 p.s.i. at a temperature of 145° C. utilizing approximately a 7 minute heating cycle and a 7 minute cooling cycle, while in curing Specimen D, the assembly was consolidated under a pressure of 1100 p.s.i. at a temperature of 135° C. for 15 minutes, again utilizing the above stated heat-up and cooling cycles. The latter procedure represents the conventional prior art method of undercuring the total assembly in order to achieve post-formability characteristics. The former conditions are those

*Table 1*

| Specimen | Core | Print | Overlay | Temp., °C. | Time, minutes | Press., p.s.i. | Heat Resist., NEMA LP2-2.03 | Post-Form, NEMA LP2-2.11 |
|---|---|---|---|---|---|---|---|---|
| A | 6 plies std. kraft | H–499 (M/F:½) | H–900 (catalyzed [1] M/F:½) | 135 | 15 | 1,100 | OK | Passed ⅜″ forming. |
| B | 3 plies std. kraft, 2 plies crepe. | H–499 (M/F:½) | H–900 (catalyzed [1] M/F:½). | 135 | 15 | 1,100 | OK | Passed ⅛″ forming. |
| C | ---do--- | H–499 (M/F:½) | H–900 (uncatalyzed M/F:½). | 145 | 15 | 1,100 | OK | Failed ¾″ forming. |
| D | ---do--- | H–499 (M/F:½) | H–900 (uncatalyzed M/F:½). | 135 | 15 | 1,100 | Failed | Passed ¾″ forming. |

[1] Catalyst acetic/diethylethanol amine ½–1.0% based on resin solids.

conventionally observed to prepare decorative melamine laminates having a maximum degree of heat and chemical resistance and where there is not the expectation that such an assembly would be post-formed.

Post-forming characteristics of the two laminates (Specimens C and D) prepared according to conventional practices were determined and compared with the specimens prepared in accordance with this invention in the manner as described hereinbefore. The results of this comparative test are set forth in Table I.

EXAMPLE II

A decorative laminate was prepared in accordance with the method described in Example I wherein 5 sheets of phenolic resin impregnated kraft paper, 2 of which were of the crepe variety constituted the core member or stock. The print sheet was of the conventional type described in Example I and similarly impregnated with the uncatalyzed melamine-formaldehyde condensate in the usual amounts of resin pick up, that is, approximately 45% based on the weight of the treated sheet. The overlay sheet consisting of a piece of H-900 paper was impregnated with the 50% solution of melamine resin to which had been added 0.5% based on the weight of the resin solid content of the aqueous syrup of hexachlorophthalic anhydride. The overlay sheet impregnated in this manner was dried in a vacuum oven maintained at 25° C. After the volatile content of the impregnated overlay had been reduced to 5% the resin pick up was determined and found to be 65%. This overlay was then assembled with the other described members and consolidated under a pressure of 1100 p.s.i. at 138° C. for a period of 17 minutes employing a heat-up cycle of 7 minutes and a cooling cycle of 7 minutes.

The laminate specimen prepared in accordance with this example showed no visible effects when a hot object at 180° C. was placed on the surface thereof for 25 minutes. The specimen was also tested for post-formability characteristics and found to withstand a ¼ inch bend without exhibiting deleterious cracking or appreciable surface appearance change at the point of the bend.

I claim:
1. A unitary, heat- and pressure-consolidated, post-formable, high pressure decorative laminated article having a heat-resistant decorative surface which comprises a superimposed assembly of:
   (A) a rigidity-imparting base member comprising a plurality of fibrous sheets impregnated with a thermosetting phenolic resin which has been advanced to a state somewhat short of substantially complete cure,
   (B) a barrier member directly bonded to said base member comprising a fibrous sheet impregnated with an uncatalyzed thermosetting melamine-formaldehyde resinous composition which has been advanced to a state somewhat short of substantially complete cure, and
   (C) an overlay member directly bonded to said barrier member comprising a fibrous sheet impregnated with a substantially completely cured melamine-formaldehyde resinous composition, said substantially completely cured composition being, in an uncured state, a curable resinous composition comprising:
      (1) a thermosetting melamine-formaldehyde resinous condensate, and
      (2) a curing catalyst for said resinous condensate, said curing catalyst being present in an amount sufficient to effect substantially complete cure of said curable resinous composition when the total superimposed assembly of said (A), said (B) and said (C) is consolidated at a temperature in the range of from about 130° C. to 140° C. under a pressure ranging from about 800 to 1500 p.s.i. for from about 10 to 20 minutes said laminated article being capable of being post-formed to an arc of a circle having a radius of ¾ of an inch without substantial loss of heat and chemical resistance.

2. A unitary, heat- and pressure-consolidated, post-formable, high pressure decorative laminated article having a heat-resistant decorative surface which comprises a superimposed assembly of:
   (A) a rigidity-imparting base member comprising a plurality of fibrous sheets impregnated with a thermosetting phenolic resin which has been advanced to a state somewhat short of substantially complete cure,
   (B) a barrier member directly bonded to said base member comprising a fibrous sheet impregnated with an uncatalyzed thermosetting melamine-formaldehyde resinous composition which has been advanced to a state somewhat short of substantially complete cure, and
   (C) an overlay member directly bonded to said barrier member comprising a fibrous sheet impregnated with a substantially completely cured melamine-formaldehyde resinous composition, said substantially completely cured composition being, in an uncured state, a curable resinous composition comprising:
      (1) a thermosetting melamine-formaldehyde resinous condensate, and
      (2) an acid curing catalyst for said resinous condensate, said curing catalyst being present in an amount sufficient to effect substantially complete cure of said curable resinous composition when the total superimposed assembly of said (A), said (B) and said (C) is consolidated at a temperature in the range of from about 130° C. to 140° C. under a pressure ranging from about 800 to 1500 p.s.i. for from about 10 to 20 minutes said laminated article being capable of being post-formed to an arc of a circle having a radius of ¾ of an inch without substantial loss of heat and chemical resistance.

3. A unitary, heat- and pressure-consolidated, post-formable, high pressure decorative laminated article having a heat-resistant decorative surface which comprises a superimposed assembly of:
   (A) a rigidity-imparting base member comprising a plurality of fibrous sheets impregnated with a thermosetting phenolic resin which has been advanced to a state somewhat short of substantially complete cure,
   (B) a barrier member directly bonded to said base member comprising a fibrous sheet impregnated with an uncatalyzed thermosetting melamine-formaldehyde resinous composition which has been advanced to a state somewhat short of substantially complete cure, and
   (C) an overlay member directly bonded to said barrier member comprising a fibrous sheet impregnated with a substantially completely cured melamine-formaldehyde resinous composition, said substantially completely cured composition being, in an uncured state, a curable resinous composition comprising:
      (1) a thermosetting melamine-formaldehyde resinous condensate, and
      (2) an acid curing catalyst for said resinous condensate, said curing catalyst being present in an amount ranging from about 0.02% to 5% by weight, based on the weight of said resinous condensate said laminated article being capable of being post-formed to an arc of a circle having a radius of ¾ of an inch without substantial loss of heat and chemical resistance.

4. A unitary, heat- and pressure-consolidated, post-formable, high pressure decorative laminated article having a heat-resistant decorative surface which comprises a superimposed assembly of:
   (A) a rigidity-imparting base member comprising a plurality of fibrous sheets impregnated with a thermosetting phenolic resin which has been advanced to a state somewhat short of substantially complete cure, (B) a barrier member directly bonded to said base member comprising a fibrous sheet impregnated with an uncatalyzed thermosetting melamine-formaldehyde resinous composition which has been advanced to a state somewhat short of substantially complete cure, and (C) an overlay member directly bonded to said barrier member comprising a fibrous sheet impregnated with a substantially completely cured melamine-formaldehyde resinous composition, said substantially completely cured composition being, in an uncured state, a curable resinous composition comprising:

(1) a thermosetting melamine-formaldehyde resinous condensate having a mol ratio of formaldehyde to melamine ranging from about 1:1 to 3:1, respectively, and (2) an acid curing catalyst for said resinous condensate, said curing catalyst being present in an amount ranging from about 0.02% to 5% by weight, based on the weight of said resinous condensate said laminated article being capable of being post-formed to an arc of a circle having a radius of ¾ of an inch without substantial loss of heat and chemical resistance.

5. A unitary, heat- and pressure-consolidated, post-formable, high pressure decorative laminated article having a heat-resistant decorative surface which comprises a superimposed assembly of:

(A) a rigidity-imparting base member comprising a plurality of fibrous sheets impregnated with a thermosetting phenolic resin which has been advanced to a state somewhat short of substantially complete cure, (B) a barrier member directly bonded to said base member comprising a fibrous sheet impregnated with an uncatalyzed thermosetting melamine-formaldehyde resinous composition which has been advanced to a state somewhat short of substantially complete cure, and (C) an overlay member directly bonded to said barrier member comprising a fibrous sheet impregnated with a substantially completely cured melamine-formaldehyde resinous composition, said substantially completely cured composition being, in an uncured state, a curable resinous composition comprising:

(1) a thermosetting melamine-formaldehyde resinous condensate having a mol ratio of formaldehyde to melamine ranging from about 1:1 to 3:1, respectively, and (2) as a curing catalyst for said resinous condensate, a mixture of an acid having a dissociation constant greater than about $1.0 \times 10^{-5}$ and an alkyl alkylol tertiary amine having a molecular weight less than about 140 wherein the weight ratio of said resinous condensate to said acid-amine mixture is from about 1:0.001 to 1:0.02, respectively, and the weight ratio of said acid to said amine is from about 1:1 to 1:10, respectively, said laminated article being capable of being post-formed to an arc of a circle having a radius of ¾ of an inch without substantial loss of heat and chemical resistance.

6. A unitary, heat- and pressure-consolidated, post-formable, high pressure decorative laminated article having a heat-resistant decorative surface which comprises a superimposed assembly of:

(A) a rigidity-imparting base member comprising a plurality of fibrous sheets impregnated with a thermosetting phenolic resin which has been advanced to a state somewhat short of substantially complete cure, (B) a barrier member directly bonded to said base member comprising a fibrous sheet impregnated with an uncatalyzed thermosetting melamine-formaldehyde resinous composition which has been advanced to a state somewhat short of substantially complete cure, and (C) an overlay member directly bonded to said barrier member comprising a fibrous sheet impregnated with a substantially completely cured melamine-formaldehyde resinous composition, said substantially completely cured composition being, in an uncured state, a curable resinous composition comprising:

(1) a thermosetting melamine-formaldehyde resinous condensate having a mol ratio of formaldehyde to melamine ranging from about 1:1 to 3:1, respectively, and (2) as a curing catalyst for said resinous condensate, a mixture of acetic acid and diethyl ethanolamine wherein the weight ratio of said resinous condensate to said acid-amine mixture is from about 1:0.005 to 1:0.02, respectively, and the weight ratio of said acid to said amine is from about 1:1 to 1:5, respectively, said laminated article being capable of being post-formed to an arc of a circle having a radius of ¾ of an inch without substantial loss of heat and chemical resistance.

References Cited in the file of this patent

UNITED STATES PATENTS

| | | |
|---|---|---|
| 2,062,088 | Dreyer | Nov. 24, 1936 |
| 2,430,708 | D'Alelio | Nov. 11, 1947 |
| 2,439,929 | Hill et al. | Apr. 20, 1948 |
| 2,563,111 | Hampson | Aug. 7, 1951 |
| 2,609,321 | Patterson | Sept. 2, 1952 |
| 2,680,700 | Meyers | June 8, 1954 |
| 2,739,094 | Schmitt | Mar. 20, 1955 |
| 2,801,198 | Morris et al. | July 30, 1957 |
| 2,833,685 | Lawrence | May 6, 1958 |
| 2,857,302 | Burton et al. | Oct. 21, 1958 |
| 2,991,215 | Kane et al. | July 4, 1961 |
| 3,018,206 | Hood et al. | Jan. 23, 1962 |

OTHER REFERENCES

"Plastics" for December 1946, pages 46, 48, 49, 94, 95.